(12) United States Patent
Nakamura

(10) Patent No.: US 12,155,248 B2
(45) Date of Patent: Nov. 26, 2024

(54) PACKAGE AND METHOD OF CHARGING SECONDARY BATTERY

(71) Applicant: Murata Manufacturing Co., Ltd., Nagaokakyo (JP)

(72) Inventor: Takanori Nakamura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 553 days.

(21) Appl. No.: 17/515,930

(22) Filed: Nov. 1, 2021

(65) Prior Publication Data

US 2022/0052539 A1 Feb. 17, 2022

Related U.S. Application Data

(63) Continuation of application No. PCT/JP2020/016851, filed on Apr. 17, 2020.

(30) Foreign Application Priority Data

Jun. 10, 2019 (JP) .................. 2019-108085

(51) Int. Cl.
*H02J 7/00* (2006.01)
*H01M 10/44* (2006.01)
*H01M 10/46* (2006.01)

(52) U.S. Cl.
CPC ........... *H02J 7/0045* (2013.01); *H01M 10/44* (2013.01); *H01M 10/46* (2013.01); *H02J 7/0013* (2013.01)

(58) Field of Classification Search
CPC ............................ H02J 7/0045; H01M 10/44
See application file for complete search history.

(56) References Cited

U.S. PATENT DOCUMENTS

| 2017/0077487 | A1* | 3/2017 | Coakley | H05K 3/4092 |
| 2018/0309305 | A1* | 10/2018 | Ford | H02J 7/0048 |

FOREIGN PATENT DOCUMENTS

| JP | S59134569 A | 8/1984 |
| JP | H09257891 A | 10/1997 |
| JP | 2004268916 A | 9/2004 |
| JP | 2005347129 A | 12/2005 |

OTHER PUBLICATIONS

International Search Report issued for PCT/JP2020/016851, date of mailing Jul. 14, 2020.

* cited by examiner

*Primary Examiner* — Robert Grant
(74) *Attorney, Agent, or Firm* — ArentFox Schiff LLP

(57) ABSTRACT

A package that includes a carrier sheet having a longitudinal direction and a lateral direction orthogonal to the longitudinal direction, the carrier sheet having a plurality of cavities arranged along the longitudinal direction, each of the plurality of cavities configured to accommodate a secondary battery having a pair of external electrodes or an electronic component including the secondary battery; a plurality of first electrodes and a plurality of second electrodes, a first electrode and a second electrode of the plurality of first electrodes and the plurality of second electrodes are disposed in a respective cavity of the plurality of cavities and configured to charge the secondary battery; a first conductive line in the carrier sheet and electrically connected to the plurality of the first electrodes; and a second conductive line in the carrier sheet and electrically connected to the plurality of the second electrodes.

18 Claims, 7 Drawing Sheets

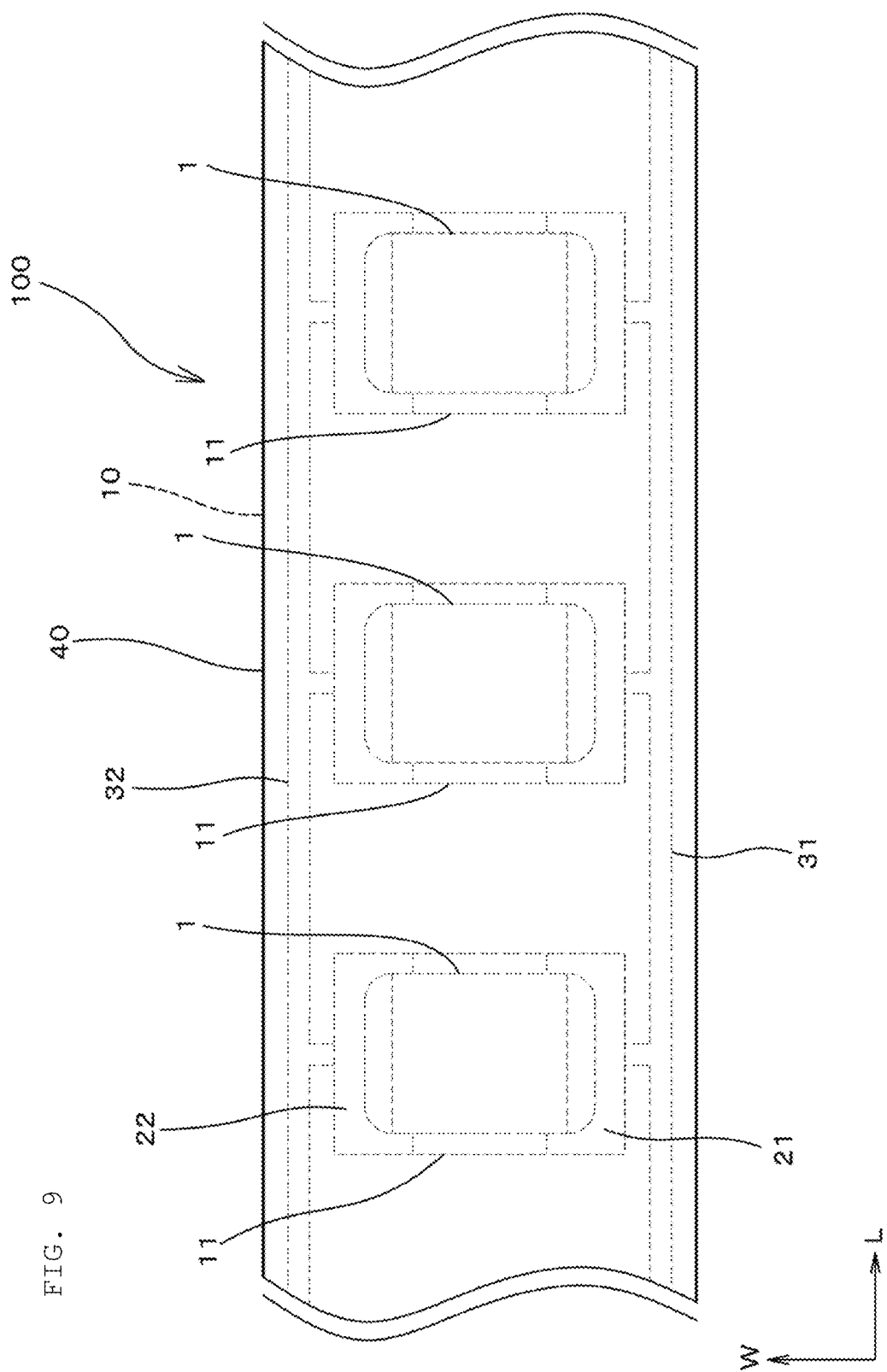

PACKAGE AND METHOD OF CHARGING SECONDARY BATTERY

CROSS REFERENCE TO RELATED APPLICATIONS

The present application is a continuation of International application No. PCT/JP2020/016851, filed Apr. 17, 2020, which claims priority to Japanese Patent Application No. 2019-108085, filed Jun. 10, 2019, the entire contents of each of which are incorporated herein by reference.

FIELD OF THE INVENTION

The present invention relates to a package that accommodates a secondary battery or an electronic component including the secondary battery, and a method of charging the secondary battery accommodated in the package.

BACKGROUND OF THE INVENTION

Patent Document 1 discloses a series of electronic components including a long carrier tape in which a plurality of cavities are formed along a longitudinal direction, an electronic component accommodated in each of the cavities, and a cover film bonded to the carrier tape so as to cover the cavities.

As an example of a usage mode of the series of electronic components, it is conceivable that the secondary battery charged in advance is transported to a manufacturing factory of an electronic device in a state of being accommodated in the cavity, and after arriving at the factory, the secondary battery is taken out from the carrier tape by having the cover film peeled off and the secondary battery is then used to manufacture the electronic device.

Patent Document 1: Japanese Patent Application Laid-Open No. 2004-268916 A

SUMMARY OF THE INVENTION

However, despite a case of the secondary battery being charged in advance before being accommodated in the cavity of the carrier tape, the capacity of the secondary battery decreases due to self-discharge if a long time has passed before the secondary battery is actually used. In that case, the secondary batteries need to be taken out one by one from the carrier tape and charged again, which takes time and effort.

The present invention has been made to solve the above problem, and an object of the present invention is to provide a package that can charge a plurality of secondary batteries or an electronic component including the secondary battery that are accommodated in a carrier sheet without having the secondary batteries or the electronic component taken out from the carrier sheet, and a method of charging the secondary battery accommodated in the package.

The package of the present invention includes: a carrier sheet having a longitudinal direction and a lateral direction orthogonal to the longitudinal direction, the carrier sheet having a plurality of cavities arranged along the longitudinal direction, each of the plurality of cavities configured to accommodate a secondary battery having a pair of external electrodes or an electronic component including the secondary battery; a plurality of first electrodes and a plurality of second electrodes, a first electrode and a second electrode of the plurality of first electrodes and the plurality of second electrodes are disposed in a respective cavity of the plurality of cavities and configured to charge the secondary battery; a first conductive line in the carrier sheet and electrically connected to the plurality of the first electrodes; and a second conductive line in the carrier sheet and electrically connected to the plurality of the second electrodes.

The cavities may be formed in plural numbers also in a lateral direction orthogonal to the longitudinal direction of the carrier sheet.

The first electrode may be formed on a first end side of the cavity, and the second electrode may be formed on a second end side of the cavity.

Further, the first electrode may be formed on a first end side of the cavity in the longitudinal direction and on a second end side of the cavity in the lateral direction orthogonal to the longitudinal direction, and the second electrode may be formed on a third end side of the cavity facing the first end side in the longitudinal direction and on a fourth end side of the cavity facing the second end side in the lateral direction.

The cavity may be provided with a movement suppression mechanism configured to suppress movement of the secondary battery or the electronic component.

The package may further include a cover sheet that is bonded to the carrier sheet so as to cover the cavity in which the secondary battery or the electronic component is accommodated, and the cover sheet may include a protrusion that abuts the secondary battery or the electronic component in a state where the cover sheet is bonded to the carrier sheet.

In a direction in which the first electrode and the second electrode face each other, the cavity and the secondary battery may have a difference in dimensions which may be smaller than a difference in dimensions between the first electrode and the second electrode.

A method of charging a secondary battery includes the steps of: accommodating the secondary battery in the cavity of any one of the above-described packages in a manner that the pair of external electrodes of the secondary battery are in contact with the first electrode and the second electrode, respectively; and applying a direct current (DC) voltage to the first conductive line and the second conductive line.

According to the package of the present invention, the secondary battery can be charged by applying the DC voltage between the first conductive line and the second conductive line in a state where the secondary battery having the pair of external electrodes or the electronic component including the secondary battery is accommodated in the cavity of the carrier sheet. As a result, despite the case of the capacity of the secondary battery charged before being accommodated in the cavity of the carrier sheet decreasing due to self-discharge, the secondary battery can be charged before being taken out from the carrier sheet. In addition, because the secondary battery can be charged before being taken out from the carrier sheet, the secondary battery or the electronic component including the secondary battery can be accommodated in the carrier sheet without charging the secondary battery.

In addition, according to the method of charging the secondary battery according to the present invention, the secondary battery can be charged by applying the DC voltage between the first conductive line and the second conductive line in the state where the secondary battery having the pair of external electrodes or the electronic component including the secondary battery is accommodated in the cavity of the carrier sheet.

BRIEF EXPLANATION OF THE DRAWINGS

FIGS. 3(a) and 3(b) are diagrams showing a positional relationship between a secondary battery and a cavity when the secondary battery is displaced in a longitudinal direction, in which FIG. 3(a) shows a state of being displaced to a side of a first electrode, and FIG. 3(b) shows a state of being displaced to a side of a second electrode.

FIG. 9 is a plan view showing a configuration of a package in a fifth embodiment.

DETAILED DESCRIPTION OF THE INVENTION

Hereinafter, features of the present invention are specifically described with reference to embodiments of the present invention.

First Embodiment

Figure 1:
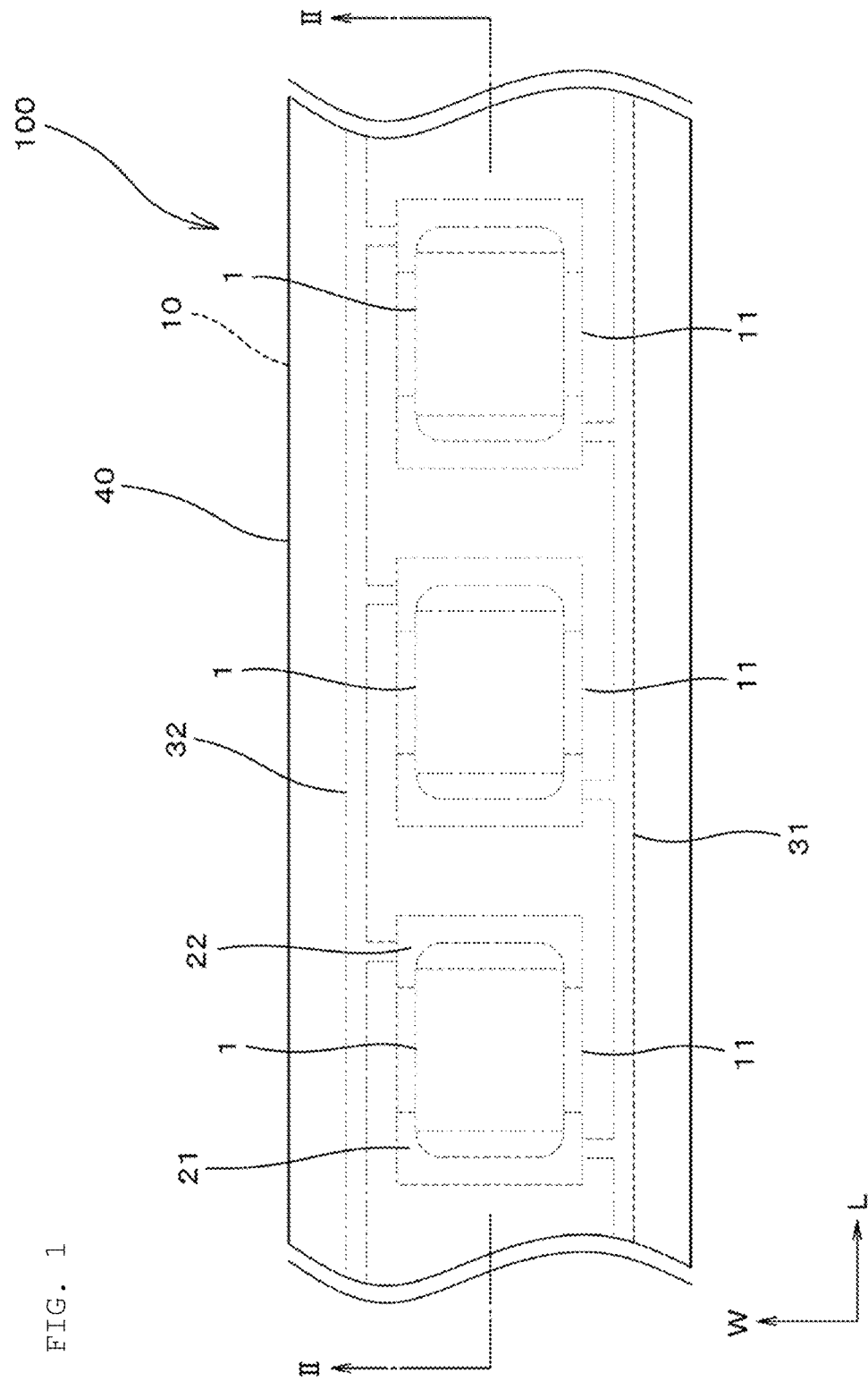
FIG. 1 is a plan view showing a configuration of a package in a first embodiment of the present invention.

FIG. 1 is a plan view showing a configuration of a package 100 in a first embodiment of the present invention.

Figure 2:
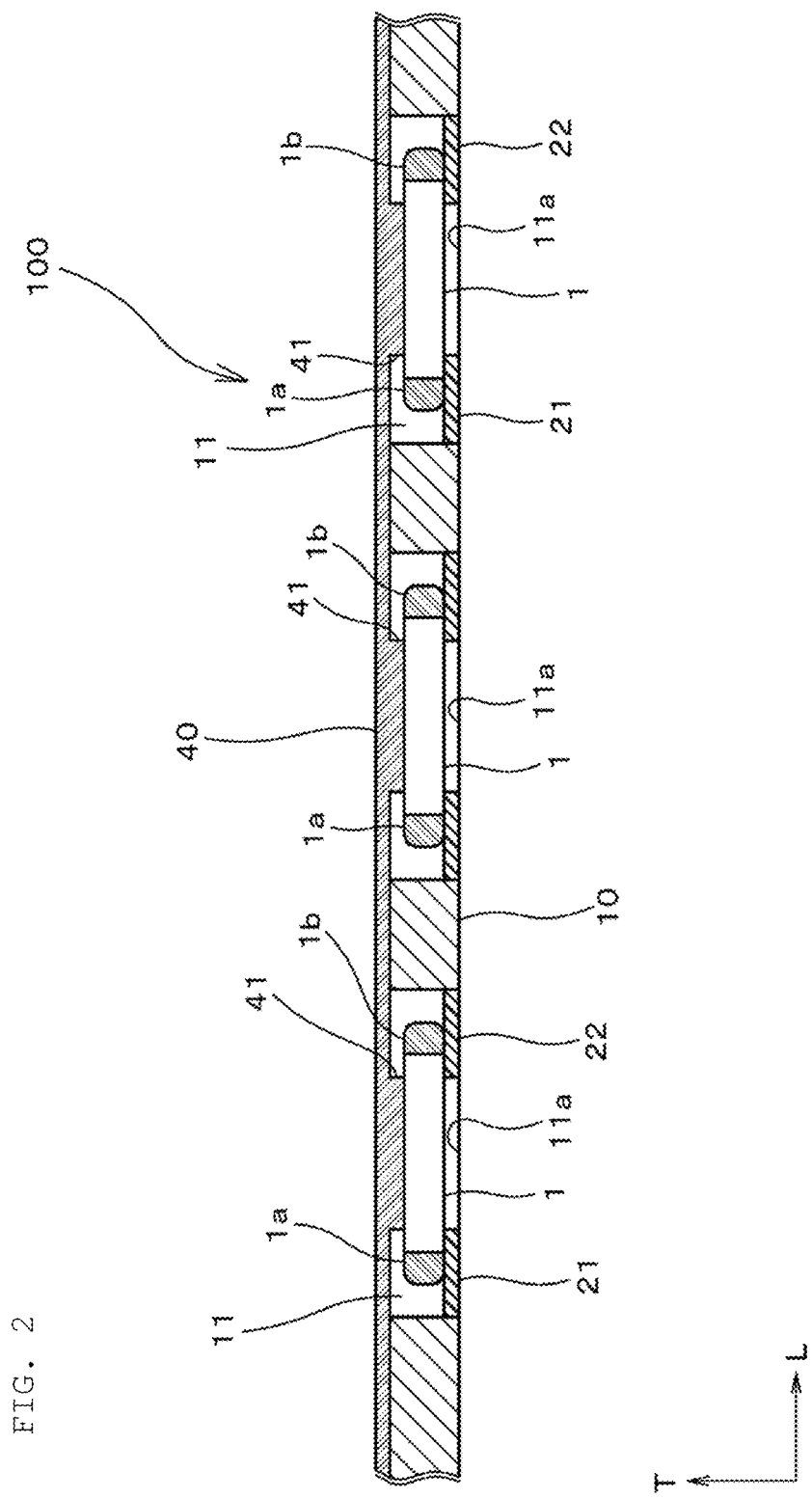
FIG. 2 is a sectional view taken along a line II-II of the package shown in FIG. 1.

FIG. 2 is a sectional view taken along a line II-II of the package 100 shown in FIG. 1.

The package 100 in the first embodiment includes a cavity 11 for accommodating the secondary battery 1 having a pair of external electrodes or an electronic component including the secondary battery 1, a long carrier sheet 10 in which a plurality of cavities 11 are formed along a longitudinal direction L, a plurality of first electrodes 21 and a plurality of second electrodes 22 for charging the secondary battery 1, a first conductive line 31 electrically connected to the plurality of first electrodes 21, and a second conductive line 32 electrically connected to the plurality of second electrodes 22.

The package 100 in the present embodiment further includes a cover sheet 40.

The carrier sheet 10 is made of material having flexibility, such as paper or synthetic resin. The dimension of the carrier sheet 10 in a lateral direction W is, for example, 10 mm, and the dimension in a thickness direction T is, for example, 3 mm. These dimensions are appropriately changed depending on the size of the secondary battery 1 to be accommodated. The dimension of the carrier sheet 10 in the longitudinal direction L can be an optional dimension.

Note that optional two directions among the longitudinal direction L, the lateral direction W, and the thickness direction T are directions orthogonal to each other.

The cavity 11 formed in the carrier sheet 10 is a space for accommodating the secondary battery 1 or the electronic component including the secondary battery 1. Here, as shown in FIGS. 1 and 2, a description is given assuming that the secondary battery 1 is accommodated in each of the plurality of cavities 11. The plurality of cavities 11 are formed, for example, at equal intervals along the longitudinal direction L of the carrier sheet 10. In the present embodiment, the cavity 11 is formed such that the longitudinal direction of the cavity 11 having a rectangular shape in plan view coincides with the longitudinal direction L of the carrier sheet 10.

The cavity 11 has a size that can fully accommodate the secondary battery 1 in plan view. However, the dimension of the cavity 11 in the lateral direction is preferably shorter than the dimension in the longitudinal direction of the secondary battery 1 to be accommodated so that the secondary battery 1 can be placed in the cavity 11 in the proper orientation. For example, the dimensions of the cavity 11 in the longitudinal direction L, the lateral direction W, and the thickness direction T shown in FIGS. 1 and 2 are 4 mm, 3 mm, and 2 mm, respectively.

In the cavity 11, the first electrode 21 and the second electrode 22 for charging the secondary battery 1 are formed. One of the first electrode 21 and the second electrode 22 is a positive electrode, and the other is a negative electrode. As described later, one of the first electrode 21 and the second electrode 22 is in contact with one of a first external electrode 1a and a second external electrode 1b, which are a pair of external electrodes of the secondary battery 1 to be accommodated, and the other of the first electrode 21 and the second electrode 22 is in contact with the other of the first external electrode 1a and the second external electrode 1b of the secondary battery 1.

In the present embodiment, in a bottom surface 11a of the cavity 11, the first electrode 21 is formed on a first end side thereof in the longitudinal direction L, and the second electrode 22 is formed on a second end side thereof in the longitudinal direction L opposite to the first end side. In the present embodiment, the dimension in the lateral direction of the first electrode 21 and the second electrode 22 is the same as the dimension in the lateral direction W of the cavity 11.

The first conductive line 31 and the second conductive line 32 are formed on the carrier sheet 10 and are made of material having conductivity. As described above, the first conductive line 31 is electrically connected to the plurality of first electrodes 21, and the second conductive line 32 is electrically connected to the plurality of second electrodes 22. That is, all the first electrodes 21 and all the second electrodes 22 are respectively connected in parallel.

The secondary battery 1 that can be charged and discharged has the first external electrode 1a and the second external electrode 1b which are the pair of external electrodes. One of the first external electrode 1a and the second external electrode 1b is a positive electrode, and the other is a negative electrode. In the present embodiment, the secondary battery 1 has a substantially rectangular parallelepiped shape.

There is no particular limitation on the type of the secondary battery 1, but the secondary battery 1 is preferably an all-solid-state battery that can perform constant voltage (CV) charging and is less likely to deteriorate after being discharged to 0 V. For example, as the secondary battery 1, the all-solid-state battery having a nominal voltage of 2.0 V and a capacity of 0.1 mAh can be used.

In a state where the secondary battery 1 is accommodated in the cavity 11 of the carrier sheet 10, as shown in FIGS. 1 and 2, the first external electrode 1a is in contact with the first electrode 21, and the second external electrode 1b is in contact with the second electrode 22. However, the first external electrode 1a may be in contact with the second electrode 22, and the second external electrode 1b may be in contact with the first electrode 21. In this state, when the first conductive line 31 and the second conductive line 32 are connected to an external power supply and a DC voltage is applied, the DC voltage is applied between the first external electrode 1a and the second external electrode 1b of the secondary battery 1, and the secondary battery 1 is charged.

That is, the method of charging the secondary battery 1 includes the steps of: (a) accommodating the secondary battery 1 in the cavity 11 of the package 100 such that one of the pair of external electrodes 1a and 1b of the secondary battery 1 is in contact with the first electrode 21 and the other is in contact with the second electrode 22; and (b) applying a DC voltage to the first conductive line 31 and the second conductive line 32.

The secondary battery 1 is charged by, for example, a CV charging in which a constant voltage is applied. As described above, because all the first electrodes 21 and all the second electrodes 22 are respectively connected in parallel, when a DC voltage is applied between the first conductive line 31 and the second conductive line 32, all the secondary batteries 1 accommodated in the cavities 11 can be charged simultaneously.

For example, by transporting the package 100 accommodating the plurality of secondary batteries 1 to a manufacturing factory of electronic devices using the secondary batteries 1, and applying a DC voltage between the first conductive line 31 and the second conductive line 32 in the manufacturing factory of the electronic devices, all the secondary batteries 1 can be charged. In this case, the secondary batteries 1 can be accommodated in the carrier sheet 10 and shipped without being charged in advance. In addition, even if the secondary batteries 1 are charged in advance, because the secondary batteries 1 can be charged before being taken out from the carrier sheet 10, a decrease in capacity due to self-discharge can be compensated for by charging at the manufacturing factory, for example. In either case, a fully charged secondary battery 1 can be mounted on the electronic device.

In addition, in the package 100 of the present embodiment, the secondary batteries 1 do not need to be taken out one by one from the carrier sheet 10 before being charged individually. Rather, all the secondary batteries 1 accommodated in the cavities 11 can be simultaneously charged, which is highly convenient.

The cavity 11 has a size that causes the first external electrode 1a of the secondary battery 1 to come into contact with the first electrode 21 and the second external electrode 1b to come into contact with the second electrode 22 despite a case of the accommodated secondary battery 1 moving and being displaced in position.

Figure 3A:
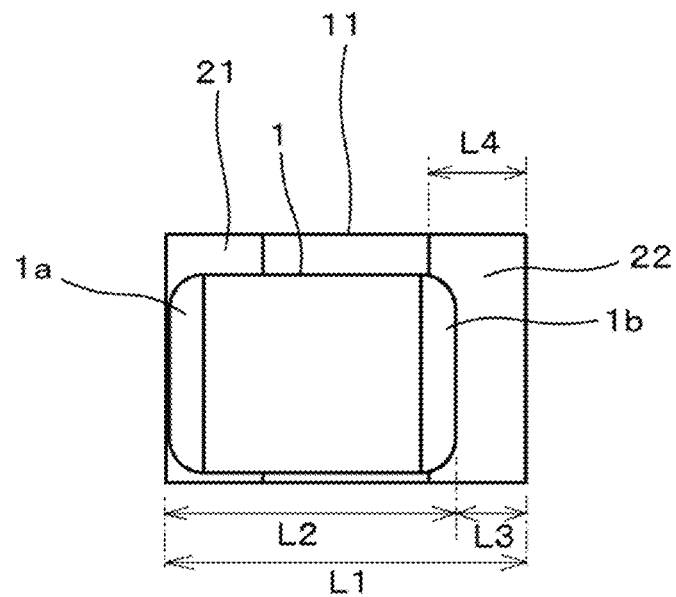
Figure 3B:
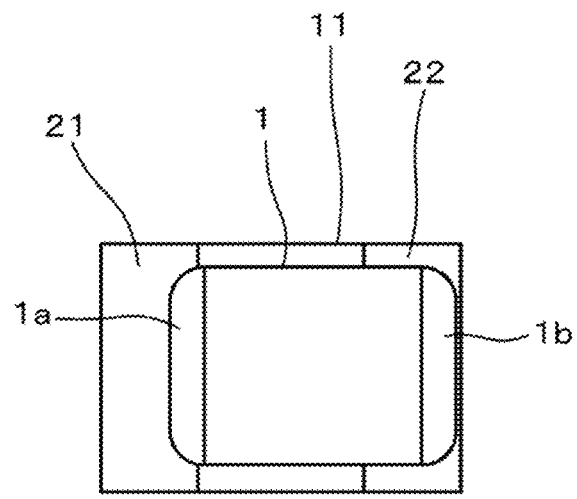

FIGS. 3(a) and 3(b) are diagrams showing a positional relationship between the secondary battery 1 and the cavity 11 when the secondary battery 1 is displaced in the longitudinal direction L, in which FIG. 3(a) shows a state of being displaced toward the first electrode 21 and FIG. 3(b) shows a state of being displaced toward the second electrode 22. As shown in FIGS. 3(a) and 3(b), despite the case of the secondary battery 1 moving in the longitudinal direction L and being displaced, the first external electrode 1a of the secondary battery 1 is in contact with the first electrode 21, and the second external electrode 1b is in contact with the second electrode 22.

In order to realize the above configuration, in a direction in which the first electrode 21 and the second electrode 22 face each other, a dimension L1 of the cavity 11 and a dimension L2 of the secondary battery 1 has a difference L3 (=L1-L2) therebetween, the difference L3 being configured to be smaller than a dimension of the first electrode 21 and a dimension L4 of the second electrode 22.

In the present embodiment, both the first electrode 21 and the second electrode 22 are formed such that the dimension in the lateral direction W is the same as the dimension in the lateral direction W of the bottom surface 11a of the cavity 11. Therefore, despite the case of the secondary battery 1 moving in the lateral direction W and being displaced, the first external electrode 1a of the secondary battery 1 is in contact with the first electrode 21, and the second external electrode 1b thereof is in contact with the second electrode 22.

That is, in a state where the secondary battery 1 is accommodated in the cavity 11, despite the case of the secondary battery 1 moving, because the first external electrode 1a is in contact with the first electrode 21 and the second external electrode 1b is in contact with the second electrode 22, the secondary battery 1 can be reliably charged.

The cover sheet 40 is bonded to the carrier sheet 10 so as to cover the opening of the cavity 11 in which the secondary battery 1 or the electronic component including the secondary battery 1 is accommodated. The cover sheet 40 is made of, for example, a synthetic resin film. The cover sheet 40 and the carrier sheet 10 are bonded together, for example, with an adhesive interposed therebetween. By bonding the cover sheet 40 to the carrier sheet 10 in a manner of covering the opening of the cavity 11 in which the secondary battery 1 or the electronic component including the secondary battery 1 is accommodated, the accommodated secondary battery 1 or electronic component can be suppressed from coming out of the cavity 11 during the transportation of the package 100, and the secondary battery 1 or the electronic component can be reliably transported.

The cover sheet 40 is provided with a protrusion 41 that abuts to the secondary battery 1 or the electronic component including the secondary battery 1 in a state where the cover sheet 40 is bonded the carrier sheet 10. FIG. 2 shows a state in which the secondary battery 1 is accommodated in the cavity 11, and the protrusion 41 provided on the cover sheet 40 abuts to the secondary battery 1 to press the secondary battery 1 from above. By providing the protrusion 41 on the cover sheet 40, the protrusion comes into contact with the secondary battery 1 accommodated in the cavity 11 to suppress the movement of the secondary battery 1 in the thickness direction T, and the electrical connection between the first external electrode 1a and the first electrode 21 and the electrical connection between the second external electrode 1b and the second electrode 22 of the secondary battery 1 can be reliably achieved. As a result, the secondary battery 1 can be reliably charged.

Note that a configuration in which the protrusion 41 is omitted from the cover sheet 40 may be adopted.

As described above, the electronic component including the secondary battery 1 can also be accommodated in the cavity 11 of the carrier sheet 10.

Figure 4:
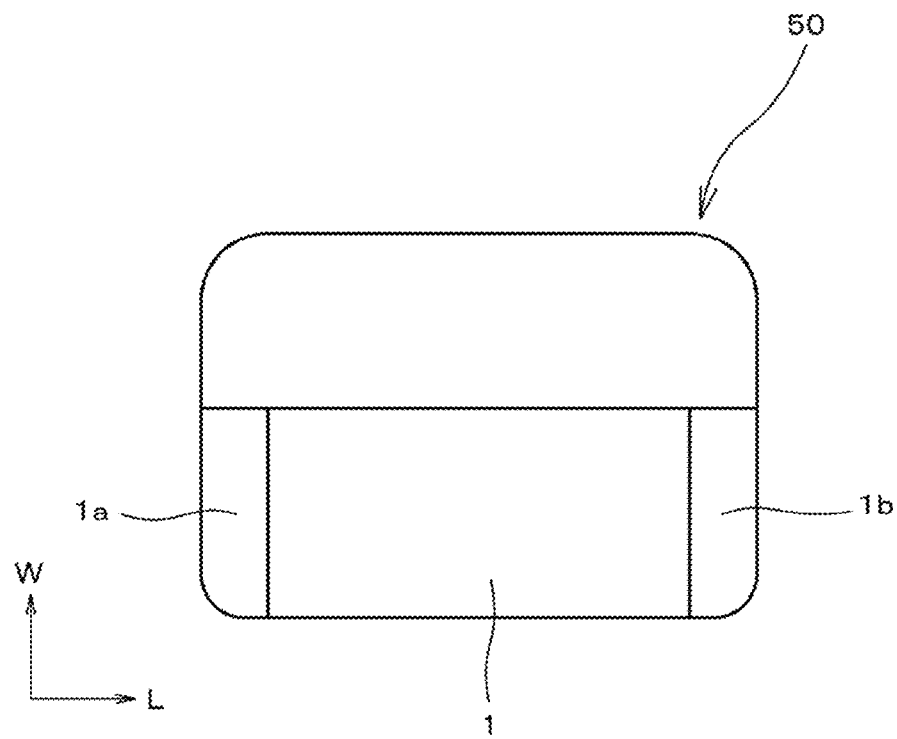
FIG. 4 is a plan view showing an example of a shape of an electronic component including a secondary battery.

FIG. 4 is a plan view showing an example of a shape of an electronic component 50 including the secondary battery 1. In the electronic component 50 shown in FIG. 4, the secondary battery 1 is arranged in a space substantially half in the lateral direction W. The secondary battery 1 has the first external electrode 1a and the second external electrode 1b facing each other in the longitudinal direction L. Also in this case, in a state where the electronic component 50 is accommodated in the cavity 11 of the carrier sheet 10, because the first external electrode 1a of the secondary battery 1 is in contact with the first electrode 21, and the second external electrode 1b is in contact with the second electrode 22, when the first conductive line 31 and the second conductive line 32 are connected to an external power supply and a DC voltage is applied, the secondary batteries 1 of all the electronic components 50 can be charged.

Figure 5:
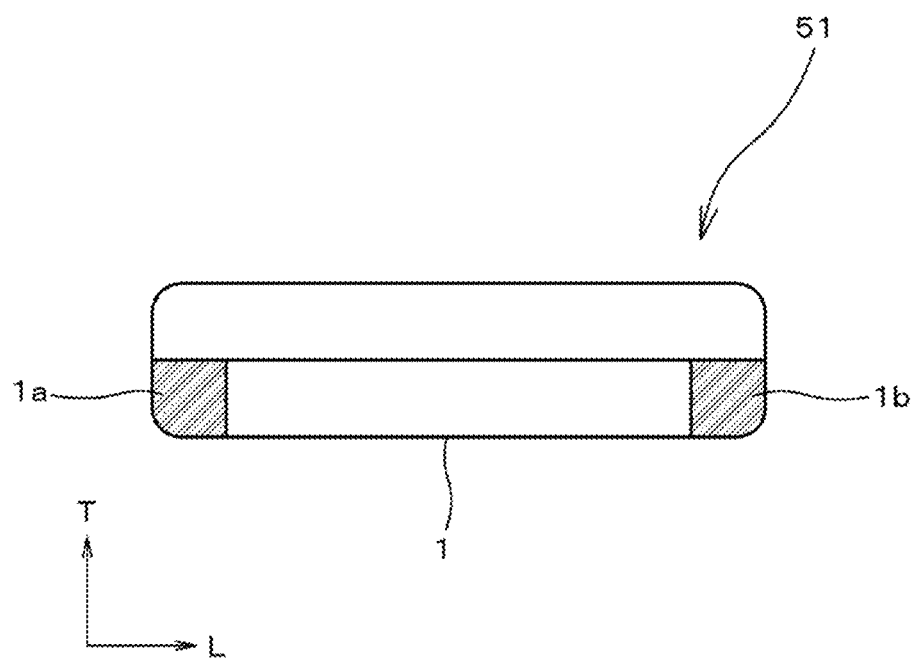
FIG. 5 is a side view showing an example of another shape of an electronic component including a secondary battery.

FIG. 5 is a side view showing an example of another shape of an electronic component 51 including the secondary battery 1. In the electronic component 51 shown in FIG. 5, the secondary battery 1 is arranged in a space substantially half in the thickness direction T. The secondary battery 1 has the first external electrode 1a and the second external electrode 1b facing each other in the longitudinal direction L. In this case, the electronic component 51 needs to be accommodated in the cavity 11 such that the first external electrode 1a of the secondary battery 1 is in contact with the first electrode 21 and the second external electrode 1b thereof is in contact with the second electrode 22. Also in this case, the secondary batteries 1 of all the electronic components 51 can be charged in the state where the electronic components 51 are accommodated in the cavities 11 of the carrier sheet 10.

Second Embodiment

In a package 100 in the second embodiment, a movement suppression mechanism for suppressing movement of a secondary battery 1 or an electronic component including the secondary battery 1 is provided in each of a plurality of cavities 11.

Figure 6:
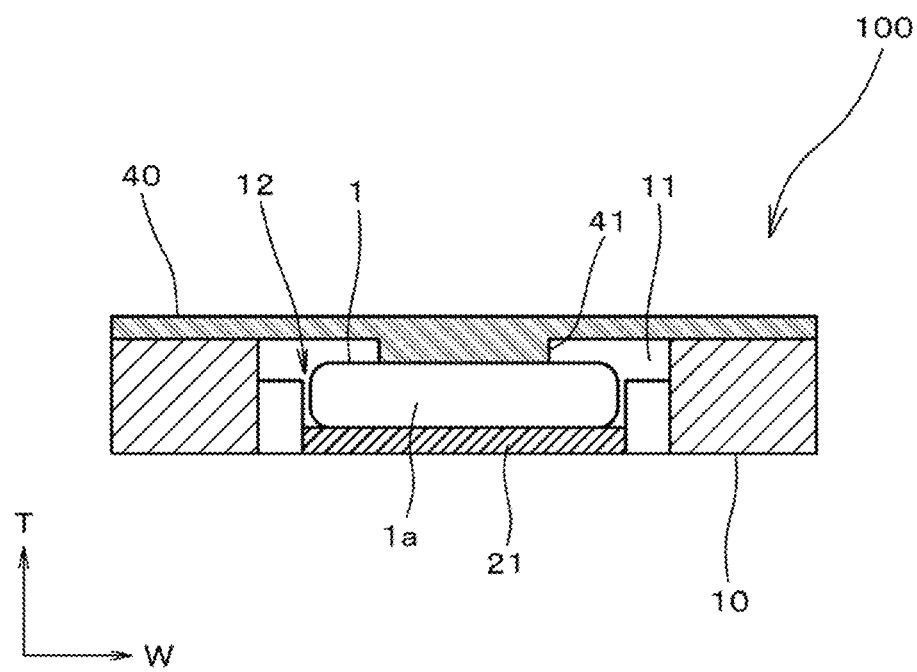
FIG. 6 is a sectional view at a position of the first external electrode of the secondary battery when the carrier sheet is viewed in a longitudinal direction.

FIG. 6 is a sectional view at a position of a first external electrode 1a of the secondary battery 1 when a carrier sheet 10 is viewed in the longitudinal direction L. Here, as the movement suppression mechanism, a groove 12 is provided in the cavity 11. The groove 12 is formed along the longitudinal direction L and has the dimension in the lateral direction W that is slightly larger than the dimension in the lateral direction W of the secondary battery 1 or the electronic component including the secondary battery 1 to be accommodated.

The secondary battery 1 or the electronic component including the secondary battery 1 is fitted in the groove 12. Here, as shown in FIG. 6, the description is made assuming that the secondary battery 1 is fitted.

By accommodating the secondary battery 1 so as to be fitted in the groove 12 when the secondary battery 1 is accommodated in the cavity 11 of the carrier sheet 10, the movement in the lateral direction W of the secondary battery 1 to be accommodated can be restricted. As a result, the electrical connection between the first external electrode 1a of the secondary battery 1 and a first electrode 21 and the electrical connection between a second external electrode 1b and a second electrode 22 can be ensured, and the secondary battery 1 can be reliably charged.

Third Embodiment

The shape of a secondary battery 1 or an electronic component including the secondary battery 1 accommodated in a cavity 11 of a carrier sheet 10 may be a substantially square shape in plan view. In this case, when the secondary battery 1 or the electronic component having a substantially square shape in plan view is accommodated in the cavity 11, it is conceivable that the secondary battery 1 or the electronic component is accommodated in a state of being erroneously rotated by 90° in the horizontal direction.

In a package 100 in the third embodiment, a first electrode 21 and a second electrode 22, which are a pair of electrodes, are formed not only on opposed end sides in the longitudinal direction L of the cavity 11 but also on opposed end sides in the lateral direction W thereof.

Figure 7:
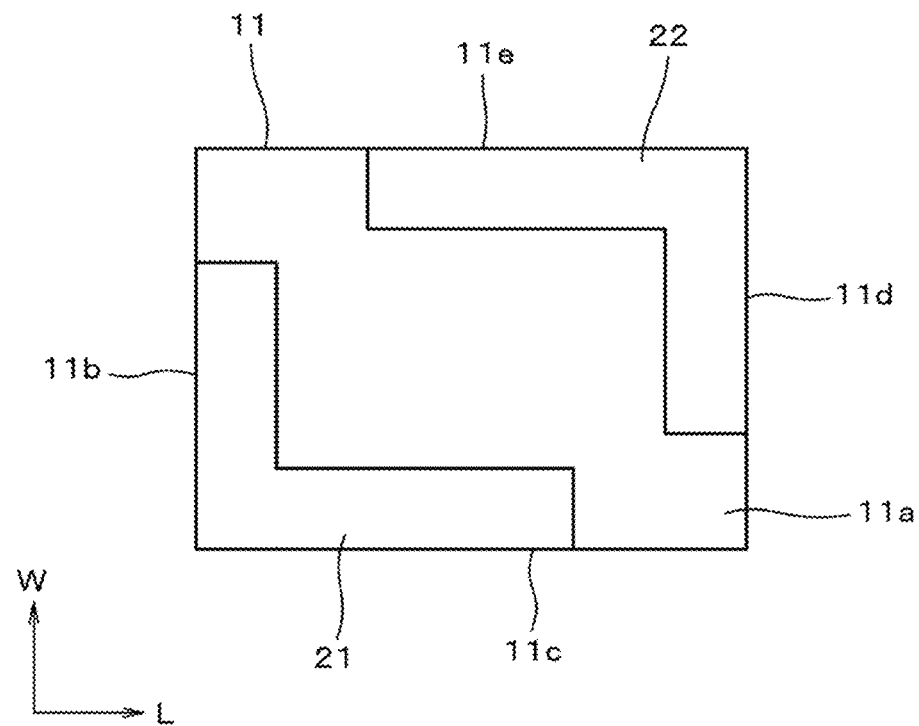
FIG. 7 is a plan view schematically showing a shape of the first electrode and the second electrode formed on a bottom surface of the cavity.

FIG. 7 is a plan view schematically showing a shape of the first electrode 21 and the second electrode 22 formed on a bottom surface 11a of the cavity 11.

The first electrode 21 has an L shape in plan view, and is formed on the first end side 11b of the cavity 11 in the longitudinal direction L and on a second end side 11c of the cavity 11 in the lateral direction W. However, the first electrode 21 is not in contact with a fourth end side 11e of the cavity 11 facing the second end side 11c in the lateral direction W.

The second electrode 22 has an L shape in plan view, and is formed on a third end side 11d of the cavity 11 facing the first end side 11b in the longitudinal direction L and on the fourth end side 11e in the lateral direction W. However, the second electrode 22 is not in contact with the second end side 11c of the cavity 11 in the lateral direction W.

Because the first electrode 21 and the second electrode 22 have the L shape, despite the case of the secondary battery 1 to be accommodated being accommodated in a state of being erroneously rotated by 90° in the horizontal direction, a first external electrode 1a of the secondary battery 1 is in contact with one of the first electrode 21 and the second electrode 22, and a second external electrode 1b is in contact with the other of the first electrode 21 and the second electrode 22. As a result, the secondary battery 1 can be reliably charged. The same applies to the electronic component including the secondary battery 1 accommodated in the cavity 11.

Fourth Embodiment

Figure 8:
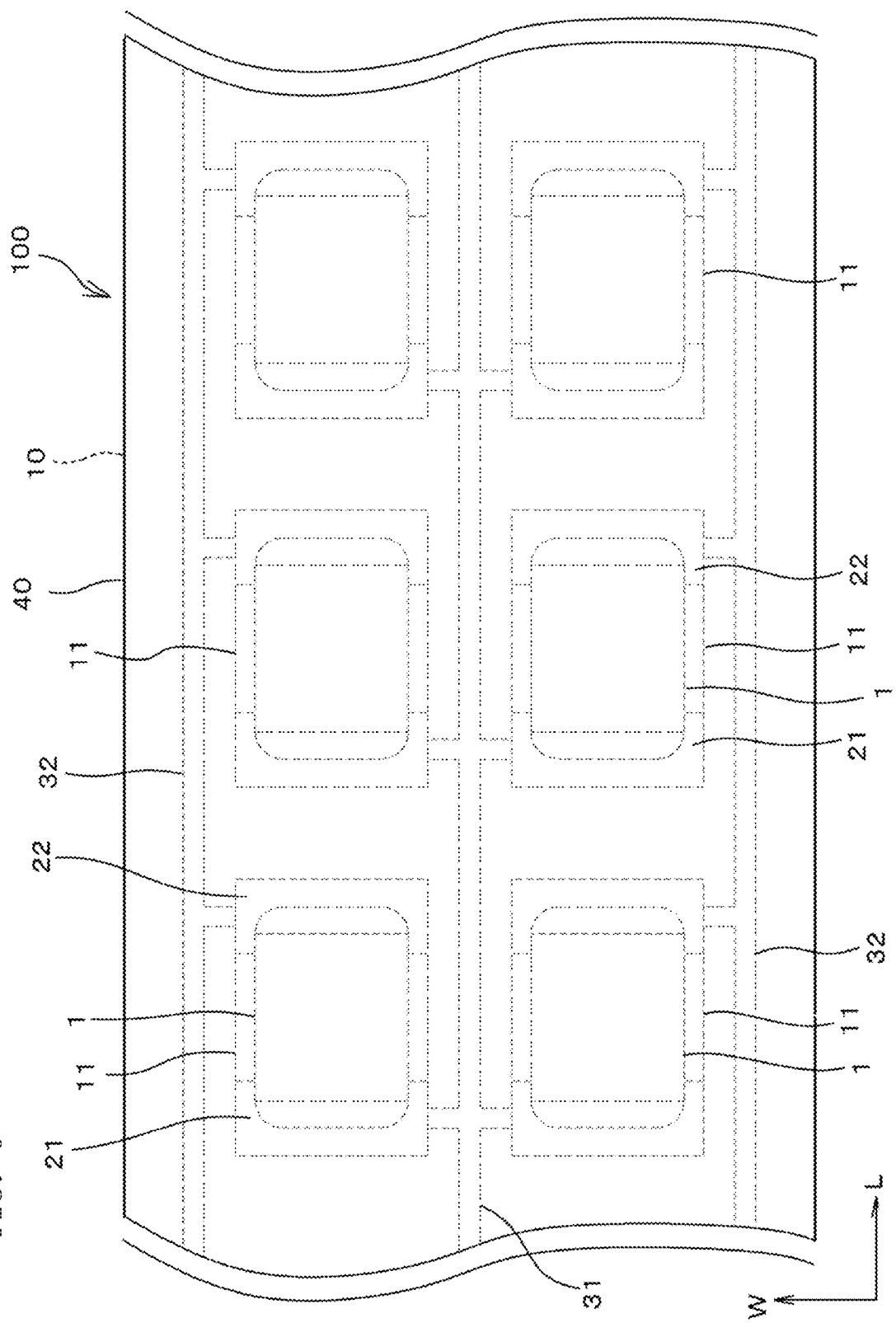
FIG. 8 is a plan view showing a configuration of a package in a fourth embodiment.

FIG. 8 is a plan view showing a configuration of a package 100 in a fourth embodiment. In the package 100 in the first embodiment shown in FIG. 1, the plurality of cavities 11 are formed in one row, but in the package 100 in the fourth embodiment, a plurality of cavities 11 are formed in two rows. That is, the plurality of cavities 11 are also formed in the lateral direction W of a carrier sheet 10.

Two second conductive lines 32 are provided in accordance with the fact that the cavities 11 are formed in two rows. As shown in FIG. 8, each of the second conductive lines 32 is electrically connected to second electrodes 22 of the cavities 11 located adjacent to each other.

On the other hand, only one first conductive line 31 is provided between the plurality of cavities 11 provided in two rows. The first conductive line 31 is electrically connected to first electrodes 21 of the cavities 11 located on both sides.

However, a configuration in which two first conductive lines 31 are provided and one second conductive line 32 is provided may be adopted.

Also in the package 100 in the present embodiment, by connecting the first conductive line 31 and the second conductive lines 32 to an external power supply and applying a DC voltage, the plurality of secondary batteries 1 accommodated in the cavities 11 formed in two rows can be simultaneously charged.

Note that in the carrier sheet 10, the plurality of cavities 11 may be formed in a plurality of rows of two or more rows.

Fifth Embodiment

In the package 100 in the first embodiment shown in FIG. 1, the longitudinal direction of the cavity 11 coincides with the longitudinal direction L of the carrier sheet 10. On the other hand, in a package 100 in a fifth embodiment, a cavity 11 is provided such that the longitudinal direction of the cavity 11 coincides with the lateral direction W of a carrier sheet 10.

FIG. 9 is a plan view showing a configuration of the package 100 in the fifth embodiment. As shown in FIG. 9, the carrier sheet 10 is provided with the cavities 11 such that the longitudinal direction of the cavity 11 having a rectangular shape in plan view coincides with the lateral direction W of the carrier sheet 10. Also in this configuration, a first conductive line 31 is electrically connected to a first electrode 21, and a second conductive line 32 is electrically connected to a second electrode 22. Therefore, by connecting the first conductive line 31 and the second conductive line 32 to an external power supply and applying a DC voltage, the plurality of secondary batteries 1 accommodated in the cavities 11 can be simultaneously charged.

The present invention is not limited to the above embodiments, and various applications and modifications can be made within the scope of the present invention.

The package 100 in the second embodiment has the configuration in which the groove 12 is provided in the cavity 11 as the movement suppression mechanism for suppressing movement of the secondary battery 1 or the electronic component including the secondary battery 1. In order to suppress the movement of the secondary battery 1 accommodated in the cavity 11 or the electronic component including the secondary battery 1, an adhesive member may be provided on the bottom surface of the cavity 11, and the secondary battery 1 or the electronic component to be accommodated may be bonded and fixed by the adhesive member.

DESCRIPTION OF REFERENCE SYMBOLS

1: Secondary battery
1a: First external electrode of secondary battery
1b: Second external electrode of secondary battery
10: Carrier sheet
11: Cavity
12: Groove in cavity
21: First electrode
22: Second electrode
31: First conductive line
32: Second conductive line
40: Cover sheet
41: Protrusion
50, 51: Electronic component
100: Package

The invention claimed is:

1. A package comprising:
a carrier sheet having a longitudinal direction and a lateral direction orthogonal to the longitudinal direction, the carrier sheet having a plurality of cavities arranged along the longitudinal direction, each of the plurality of cavities configured to fully accommodate a secondary battery having a pair of external electrodes or an electronic component including the secondary battery;
a plurality of first electrodes and a plurality of second electrodes, a first electrode and a second electrode of the plurality of first electrodes and the plurality of second electrodes are disposed on a same surface in a respective cavity of the plurality of cavities and configured to charge the secondary battery;
a first conductive line in the carrier sheet and electrically connected to the plurality of the first electrodes; and
a second conductive line in the carrier sheet and electrically connected to the plurality of the second electrodes,
wherein in a direction in which the first electrode and the second electrode face each other, a dimension L1 of the cavity and a dimension L2 of the secondary battery or the electronic component including the secondary battery to be accommodated in the cavity has a difference L3 therebetween, the difference L3 being smaller than a dimension of the first electrode and a dimension of the second electrode in the direction in which the first electrode and the second electrode face each other.

2. The package according to claim 1, wherein the plurality of cavities are a first plurality of cavities, and the package further comprises a second plurality of cavities arranged along the longitudinal direction and spaced from the first plurality of cavities in the lateral direction.

3. The package according to claim 2, wherein the first electrode is on a first end side of the respective cavity, and the second electrode is on a second end side of the respective cavity.

4. The package according to claim 3, wherein the first end side and the second end side oppose each other in the longitudinal direction.

5. The package according to claim 3, wherein the first end side and the second end side oppose each other in the lateral direction.

6. The package according to claim 2, wherein
the first electrode is on a first end side of the respective cavity in the longitudinal direction and on a second end side of the respective cavity in the lateral direction, and
the second electrode is on a third end side of the respective cavity facing the first end side in the longitudinal direction and on a fourth end side of the respective cavity facing the second end side in the lateral direction.

7. The package according to claim 1, wherein the first electrode is on a first end side of the respective cavity, and the second electrode is on a second end side of the respective cavity.

8. The package according to claim 7, wherein the first end side and the second end side oppose each other in the longitudinal direction.

9. The package according to claim 7, wherein the first end side and the second end side oppose each other in the lateral direction.

10. The package according to claim 1, wherein
the first electrode is on a first end side of the respective cavity in the longitudinal direction and on a second end side of the respective cavity in the lateral direction, and
the second electrode is on a third end side of the respective cavity facing the first end side in the longitudinal direction and on a fourth end side of the respective cavity facing the second end side in the lateral direction.

11. The package according to claim 1, further comprising a movement suppression mechanism configured to suppress movement of the secondary battery or the electronic component within the respective cavity.

12. The package according to claim 1, further comprising a cover sheet bonded to the carrier sheet so as to cover the plurality of cavities.

13. The package according to claim 12, wherein the cover sheet includes a protrusion that abuts the secondary battery or the electronic component within the respective cavity in a state where the cover sheet is bonded to the carrier sheet.

14. A method of charging a secondary battery, the method comprising:
provone package that includes:
a carrier sheet having a longitudinal direction and a lateral direction orthogonal to the longitudinal direction, the carrier sheet having a plurality of cavities arranged along the longitudinal direction, each of the plurality of cavities configured to fully accommodate a secondary battery having a pair of external electrodes or an electronic component including the secondary battery;
a plurality of first electrodes and a plurality of second electrodes, a first electrode and a second electrode of the plurality of first electrodes and the plurality of second electrodes are disposed on a same surface in a respective cavity of the plurality of cavities and configured to charge the secondary battery;
a first conductive line in the carrier sheet and electrically connected to the plurality of the first electrodes; and
a second conductive line in the carrier sheet and electrically connected to the plurality of the second electrodes,
wherein in a direction in which the first electrode and the second electrode face each other, a dimension L1 of the cavity and a dimension L2 of the secondary battery or the electronic component including the secondary battery to be accommodated in the cavity has a difference L3 therebetween, the difference L3 being smaller than a dimension of the first electrode and a dimension of the second electrode in the direction in which the first electrode and the second electrode face each other;
accommodating the secondary battery in the respective cavity of the package so that the pair of external electrodes of the secondary battery are in contact with the first electrode and the second electrode, respectively; and
applying a direct current voltage to the first conductive line and the second conductive line.

15. The method of charging a secondary battery according to claim 14, wherein the plurality of cavities are a first plurality of cavities, and the package further includes a second plurality of cavities arranged along the longitudinal direction and spaced from the first plurality of cavities in the lateral direction.

16. The method of charging a secondary battery according to claim 14, further comprising providing a movement suppression mechanism configured to suppress movement of the secondary battery or the electronic component within the respective cavity.

17. The method of charging a secondary battery according to claim 14, further comprising bonding a cover sheet to the carrier sheet so as to cover the plurality of cavities.

18. The method of charging a secondary battery according to claim 17, wherein the cover sheet includes a protrusion that abuts the secondary battery or the electronic component within the respective cavity in a state where the cover sheet is bonded to the carrier sheet.

* * * * *